(12) United States Patent
Mochizuki et al.

(10) Patent No.: US 8,411,384 B2
(45) Date of Patent: Apr. 2, 2013

(54) WRITER HAVING A SHIELD STRUCTURE FOR ADJACENT AND FAR TRACK INTERFERENCE REFRESHMENT

(75) Inventors: Masafumi Mochizuki, Chigasaki (JP); Ichiro Yokokawa, Chigasaki (JP); Satoshi Ohki, Isehara (JP)

(73) Assignee: HGST Netherlands B.V., Amsterdam (NL)

( * ) Notice: Subject to any disclaimer, the term of this patent is extended or adjusted under 35 U.S.C. 154(b) by 21 days.

(21) Appl. No.: 13/154,343

(22) Filed: Jun. 6, 2011

(65) Prior Publication Data

US 2012/0307394 A1 Dec. 6, 2012

(51) Int. Cl.
G11B 27/36 (2006.01)
G11B 5/33 (2006.01)
G11B 5/127 (2006.01)

(52) U.S. Cl. .......................................... 360/31; 360/319

(58) Field of Classification Search ........................ None
See application file for complete search history.

(56) References Cited

U.S. PATENT DOCUMENTS

| | | | |
|---|---|---|---|
| 5,075,956 A | 12/1991 | Das | |
| 7,019,944 B2 | 3/2006 | Matono et al. | |
| 7,460,342 B2 | 12/2008 | Guan et al. | |
| 7,486,457 B2 * | 2/2009 | Jen et al. | 360/31 |
| 7,542,233 B2 | 6/2009 | Hirata et al. | |
| 7,616,403 B2 | 11/2009 | Ho et al. | |
| 7,808,742 B2 | 10/2010 | Kamijima et al. | |
| 7,843,667 B2 | 11/2010 | Hirata et al. | |
| 8,174,780 B1 * | 5/2012 | Tsai et al. | 360/31 |
| 2004/0151036 A1 | 8/2004 | Aoyagi et al. | |
| 2006/0082930 A1 | 4/2006 | Fukui et al. | |
| 2009/0168241 A1 | 7/2009 | Mochizuki et al. | |
| 2009/0219649 A1 | 9/2009 | Hsiao et al. | |
| 2010/0110585 A1 | 5/2010 | Takano et al. | |
| 2010/0232062 A1 | 9/2010 | Gao et al. | |
| 2011/0181988 A1 * | 7/2011 | Garfunkel et al. | 360/319 |

FOREIGN PATENT DOCUMENTS

| | | |
|---|---|---|
| JP | 57179924 A | 11/1982 |
| JP | 2006/252756 A | 9/2006 |
| JP | 2010/040066 A | 2/2010 |

OTHER PUBLICATIONS

Song et al., "Micromagnetic Analysis of Adjacent Track Erasure of Wrapped-Around Shielded PMR Writers," Oct. 2009 IEEE, IEEE Transactions on Magnetics, vol. 45, No. 10, pp. 3730-3732.

* cited by examiner

*Primary Examiner* — Regina N Holder
(74) *Attorney, Agent, or Firm* — Zilka-Kotab, PC

(57) ABSTRACT

In one embodiment, a data storage system includes a magnetic head having a main magnetic pole and a wrap around shield positioned around the main magnetic pole at an ABS thereof, a magnetic medium, a drive mechanism for passing the magnetic medium over the magnetic head, and a controlling mechanism electrically coupled to the magnetic head for controlling operation of the magnetic head that initiates rewriting of information of a recording track of the magnetic medium if a recording magnetic field applied to the recording track exceeds a threshold. In another embodiment, a method includes writing data to a first track of a magnetic medium using a magnetic head, determining characteristics consistent with data degradation from tracks adjacent to the first track and far tracks away from the first track using a controlling mechanism, and rewriting data in tracks determined to be degraded due to ATI and/or FTI.

22 Claims, 13 Drawing Sheets

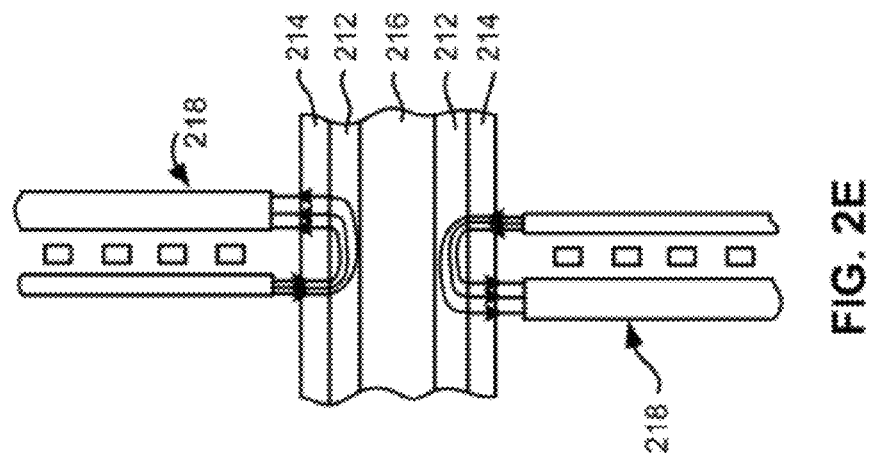
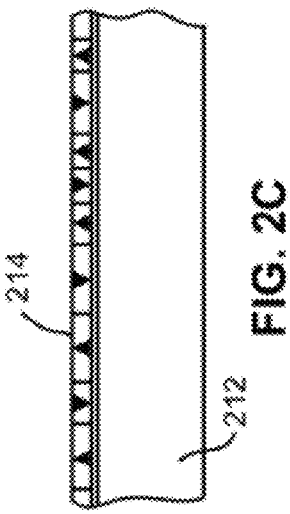
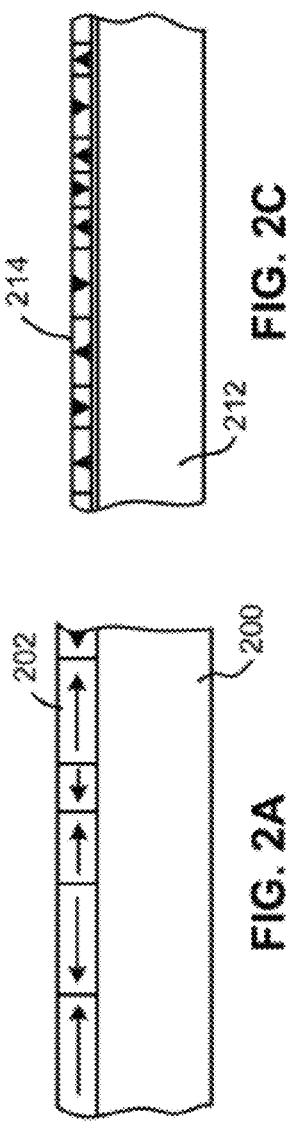
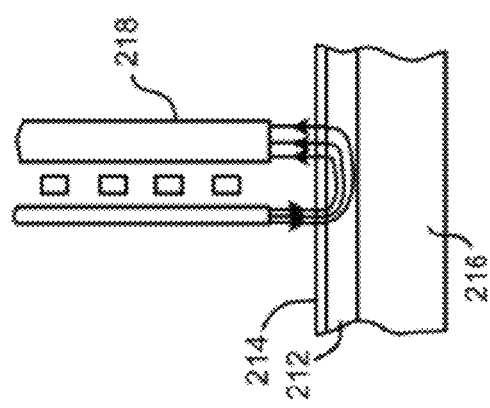
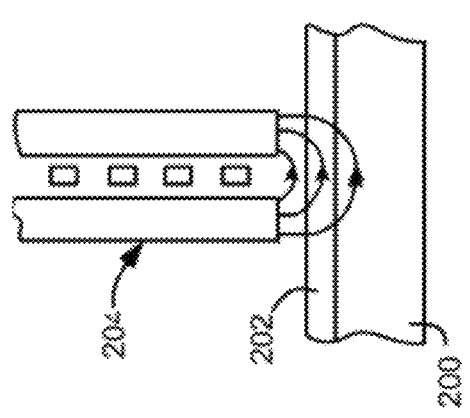

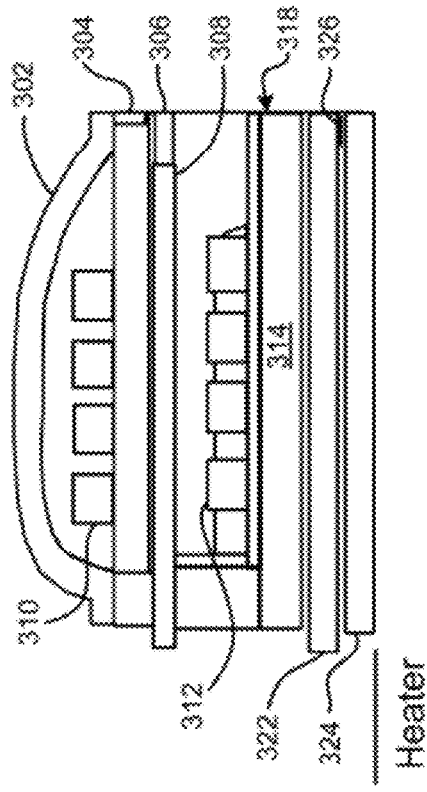
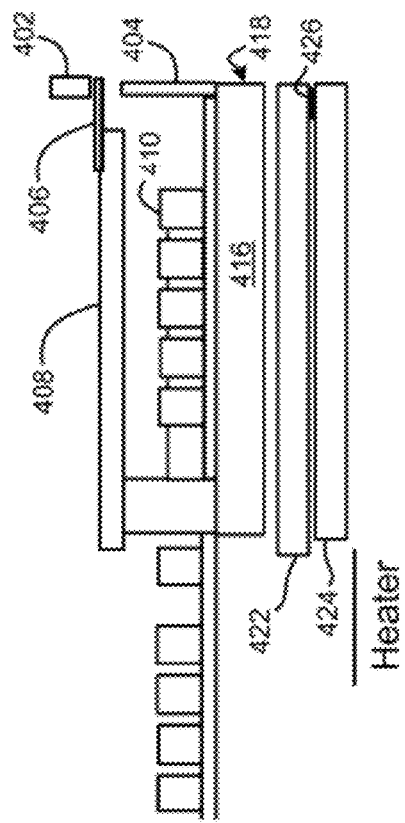
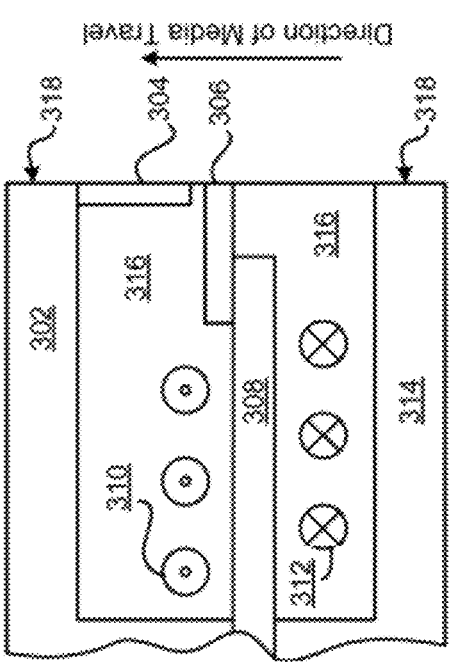
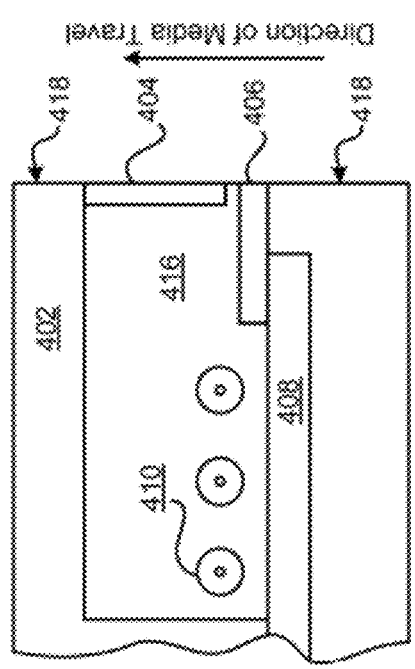

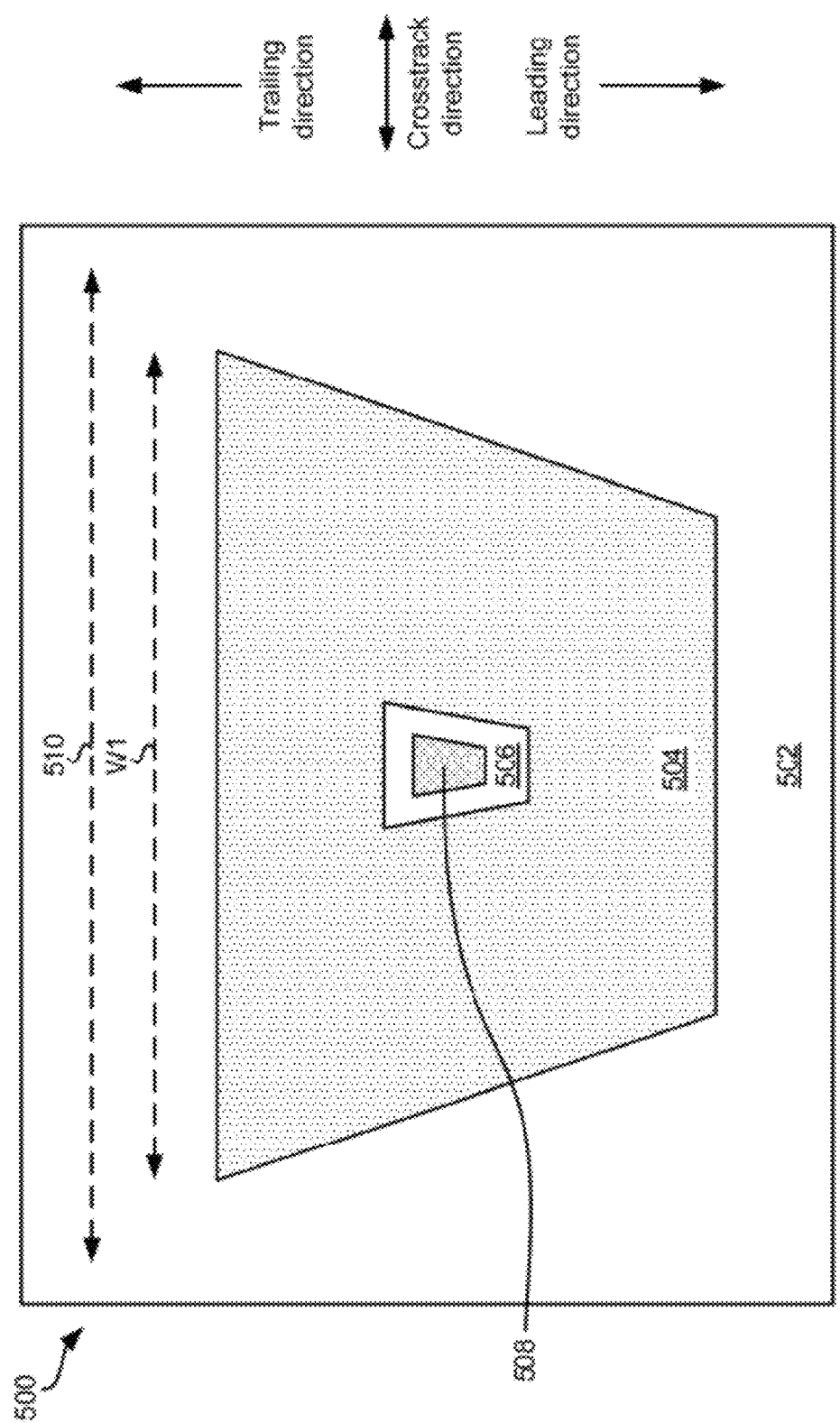

WRITER HAVING A SHIELD STRUCTURE FOR ADJACENT AND FAR TRACK INTERFERENCE REFRESHMENT

FIELD OF THE INVENTION

The present invention relates to a magnetic recording head, and more specifically, to a magnetic recording head having a writer with a shield structure capable of adjacent and far track interference refreshment.

BACKGROUND OF THE INVENTION

Hard disk drives (HDDs) have become the preeminent mass storage medium in the field of digital information storage. In order to increase a magnetic field gradient to the surroundings of the main magnetic pole, the wrap around shield (WAS) is used in perpendicular magnetic recording. A perpendicular writer having a single main pole with a soft underlayer and a WAS can generate a strong magnetic recording field with a high magnetic gradient into the recording layer of a magnetic recording medium.

However, the recording magnetic field intensity experienced by adjacent tracks to the track being written becomes larger as magnetic media having higher track densities (TPI) are used. Consequently, tracks adjacent to the track being written are being eliminated or degraded, which is referred to as adjacent track interference (ATI). As field intensity continues to increase in modern magnetic recording systems, ATI is becoming quite great.

Moreover, another problem exists where written data may be eliminated, but instead of occurring in an adjacent track, the data elimination occurs at a far track, referred to as far track interference (FTI).

These problems may result from a magnetic domain that forms from the soft magnetic layer of the WAS and is based on a disclosure magnetic field therefrom. FIG. 9 shows an amount of degradation of the error rate caused by FTI. The horizontal axis denotes the track width direction position and the vertical axis shows the amount of degradation of the error rate by FTI. As shown in FIG. 9, the amount of degradation of the error rate increases relative to distance from a center crosstrack position.

In order to achieve higher density in a magnetic disk device, a perpendicular magnetic recording system is typically employed. In such systems, a WAS is used in the magnetic recording head in order to increase the magnetic field gradient around the main magnetic pole. This construction has a characteristic of producing a stronger recording magnetic field with a steeper gradient which can be applied to the recording layer of the magnetic medium to write data.

However, while higher track densities (TPI) may be achieved by increasing the density of recording, this results in the recording magnetic field intensity that is applied to adjacent tracks to become large, exacerbating the problem of adjacent track erasure due to ATI. Also, a problem arises where erasure of data occurs not only in adjacent tracks but also in tracks that are a few tracks further away due to FTI. It is believed that this is due to magnetic field leakage being produced from the magnetic domains that are formed by the soft magnetic film of the WAS. FIG. 9 shows the amount of degradation of the error rate produced by exemplary FTI. The horizontal axis shows the position in the track width direction and the vertical axis shows the amount of degradation of the error rate produced by FTI. It can be seen that there is a considerable amount of degradation of the error rate even in tracks that are a few tracks further away from the track being written.

As a countermeasure to the effects of ATI and FTI, systems have been developed (herein referred to as a "refreshment system") for storing the information as to the position passed by the head, and the number of times the head passes, in respect of any given track on the HDD, and, taking into consideration this number of times and the position, re-recording the data in the corresponding track every time the head passes (recording) at least a fixed number of times, in fact the amount of information as to the position over which the head passes (recording) is restricted, due to limitations regarding memory, etc. The range over which this technique is to be applied is determined in terms of the track number and the track pitch.

SUMMARY OF THE INVENTION

In one embodiment, a data storage system includes a main magnetic pole, a wrap around shield (WAS) positioned around the main magnetic pole near an air bearing surface (ABS) thereof, wherein a maximum width in a crosstrack direction of the WAS exposed at the ABS is narrower than a predetermined risk range measured in the crosstrack direction, and a mechanism that initiates rewriting of information of a recording track of a magnetic medium if a recording magnetic field applied to the recording track exceeds a threshold value.

In another embodiment, a data storage system includes a magnetic head, the magnetic head including a main magnetic pole and a WAS positioned around the main magnetic pole at an ABS thereof, wherein a maximum width in a crosstrack direction of the WAS exposed at the ABS is narrower than a predetermined risk range measured in the crosstrack direction, a magnetic medium, a drive mechanism for passing the magnetic medium over the magnetic head, and a controlling mechanism electrically coupled to the magnetic head for controlling operation of the magnetic head that initiates rewriting of information of a recording track of the magnetic medium if a recording magnetic field applied to the recording track exceeds a threshold value.

In still another embodiment, a method for storing data to a magnetic medium includes writing data to a first track of a magnetic medium using a magnetic head, determining characteristics consistent with data degradation from tracks adjacent to the first track and far tracks away from the first track using a controlling mechanism, and rewriting data in tracks determined to be degraded due to adjacent track interference (ATI) and/or far track interference (FTI), wherein the magnetic head includes a main magnetic pole and a WAS positioned around the main magnetic pole at an ABS thereof, wherein a maximum width in a crosstrack direction of the WAS exposed at the ABS is narrower than a predetermined risk range measured in the crosstrack direction, and wherein the controlling mechanism is electrically coupled to the magnetic head for controlling operation of the magnetic head and initiates rewriting of information of a recording track of the magnetic medium if a recording magnetic field applied to the recording track exceeds a threshold value.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

FIG. 5A shows a schematic representation of an air-bearing surface (ABS) of a magnetic head, according to one embodiment.

DETAILED DESCRIPTION

Figure 1:
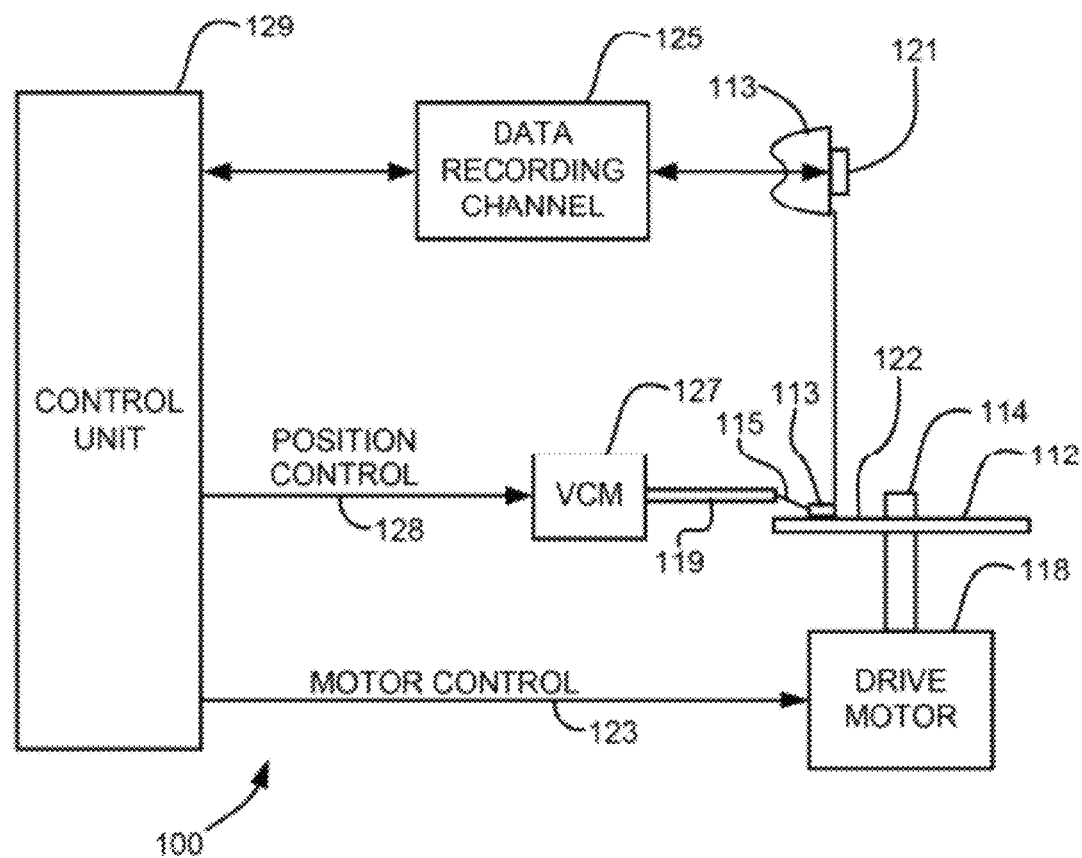
FIG. 1 is a simplified drawing of a magnetic recording disk drive system, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

Although refreshment systems have been developed, there are problems in their use, including the limited amount of information that may be stored regarding the position passed by the head and the number of times the head passes, with respect to any given track on a hard disk drive (HDD). In one embodiment, a recording head structure and magnetic disk device using the magnetic head are presented, whereby the risk of adjacent track interference (ATI) and/or far track interference (FTI) in perpendicular magnetic recording is reduced without increasing the amount of memory used for the refreshment system.

According to preferred embodiments, HDDs using the techniques described herein may be provided in which the refreshment system can be implemented without increasing the memory usage according to the position passed while recording information by the head, and furthermore which exhibit high reliability with concurrently low or null ATI/FTI.

In one general embodiment, a data storage system includes a main magnetic pole, a wrap around shield (WAS) positioned around the main magnetic pole near an air bearing surface (ABS) thereof, wherein a maximum width in a crosstrack direction of the WAS exposed at the ABS is narrower than a predetermined risk range measured in the crosstrack direction, and a mechanism that initiates rewriting of information of a recording track of a magnetic medium if a recording magnetic field applied to the recording track exceeds a threshold value.

In another general embodiment, a data storage system includes a magnetic head, the magnetic head including a main magnetic pole and a WAS positioned around the main magnetic pole at an ABS thereof, wherein a maximum width in a crosstrack direction of the WAS exposed at the ABS is narrower than a predetermined risk range measured in the crosstrack direction, a magnetic medium, a drive mechanism for passing the magnetic medium over the magnetic head, and a controlling mechanism electrically coupled to the magnetic head for controlling operation of the magnetic head that initiates rewriting of information of a recording track of the magnetic medium if a recording magnetic field applied to the recording track exceeds a threshold value.

In still another general embodiment, a method for storing data to a magnetic medium includes writing data to a first track of a magnetic medium using a magnetic head, determining characteristics consistent with data degradation from tracks adjacent to the first track and far tracks away from the first track using a controlling mechanism, and rewriting data in tracks determined to be degraded due to ATI and/or FTI, wherein the magnetic head includes a main magnetic pole and a WAS positioned around the main magnetic pole at an ABS thereof, wherein a maximum width in a crosstrack direction of the WAS exposed at the ABS is narrower than a predetermined risk range measured in the crosstrack direction, and wherein the controlling mechanism is electrically coupled to the magnetic head for controlling operation of the magnetic head and initiates rewriting of information of a recording track of the magnetic medium if a recording magnetic field applied to the recording track exceeds a threshold value.

Referring now to the figures, in FIG. 1 there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an ABS of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

A schematic representative of a magnetic head including a WAS 500 is shown in FIG. 5A from the ABS side, according to one embodiment. As shown, the magnetic head includes a main magnetic pole 508 surrounded by a gap 506, and a WAS 500 characterized by a recessed region 502, which is recessed from the ABS outside a risk-range 510, and an ABS exposed region 504, which is exposed at the ABS within the risk-range 510 along a maximum edge width W1 in a crosstrack direction of the exposed region 504. As shown in FIG. 5A, and consist with typical magnetic heads using a WAS, the WAS width is maximized at an ABS exposed trailing edge thereof.

In one embodiment, shown in FIG. 5A, the width W1 where the WAS 500 and the main magnetic pole 508 are exposed at the ABS surface is narrower than the risk-range 510 where head passage is taken into consideration by the refreshment system and stored to memory for using to refresh tracks which may have been eliminated or degraded due to head passage.

Figure 5B:
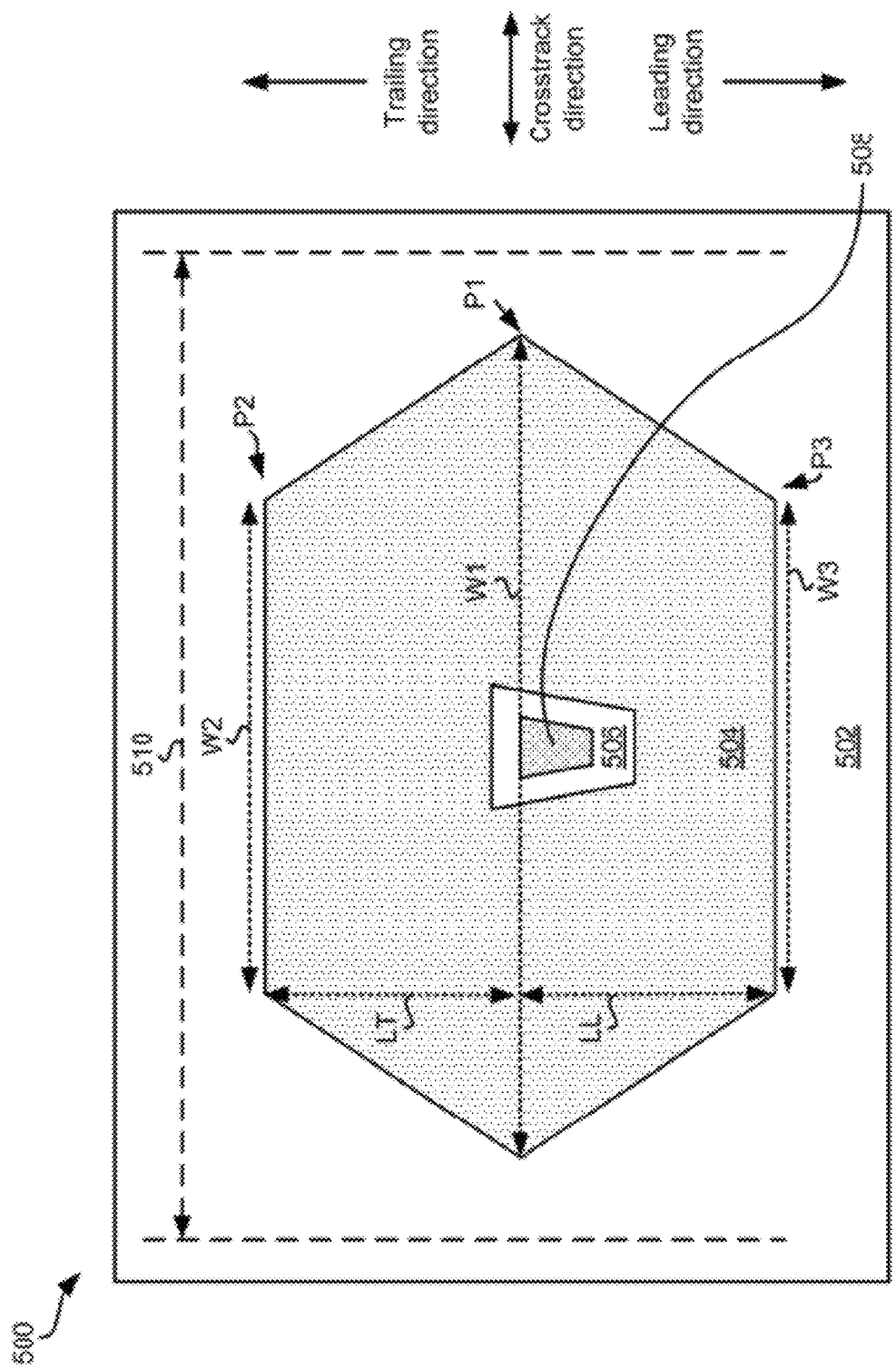
FIG. 5B shows a schematic representation of the ABS side of a magnetic head, according to one embodiment.

In another embodiment, as shown in FIG. 5B, the exposed region 504 of the WAS 500 may have a hexagonal shape defined by two longer sides parallel to the crosstrack direction and oriented at a leading edge and a trailing edge of the WAS 500, respectively.

Additionally, and as further shown in FIG. 5B, the exposed region 504 of the WAS 500 may be characterized by each of a leading edge width W3 and a trailing edge width W2 being less than the maximum edge width W1. In another embodiment, the leading edge width W3 and the trailing edge width W2 may be substantially equal. Along the direction of media travel, the exposed region 504 of the WAS 500 may further exhibit a trailing length LT measured as a distance from the trailing edge of the exposed region 504 of the WAS 500 to the trailing edge of the main magnetic pole 508, and a leading length LL measured as a distance from the leading edge of the exposed region 504 of the WAS 500 to the leading edge of the main magnetic pole 508. In preferred embodiments, the sides of the exposed region 504 of the WAS 500 may taper inward from the trailing edge of the main magnetic pole 508 to the trailing edge of the exposed region 504 of the WAS 500 causing the width to decrease toward the trailing direction, as shown in FIG. 5B.

Figure 5C:
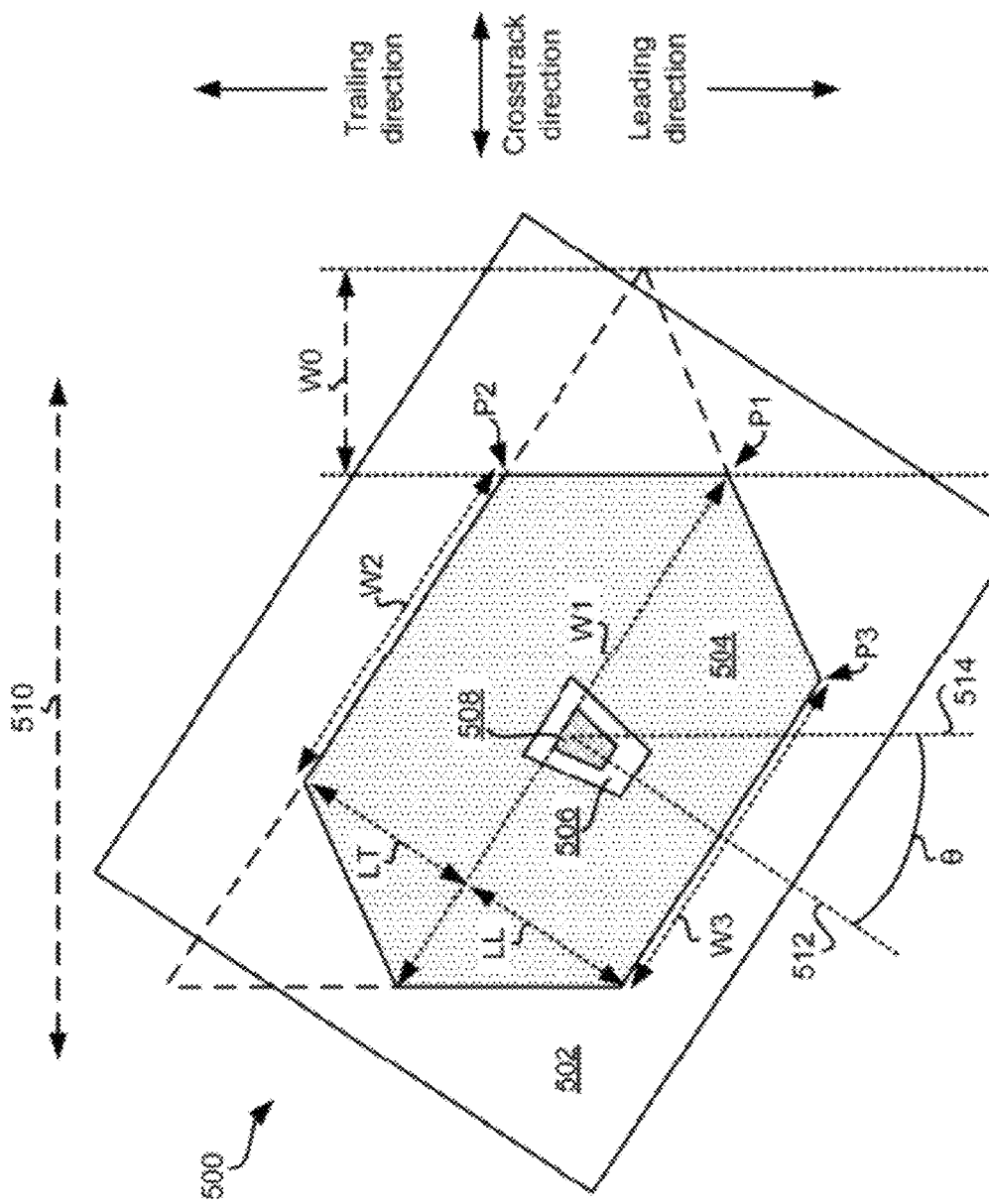
FIG. 5C shows a schematic representation of the ABS side of a magnetic head aligned at a skew angle θ, according to one embodiment.
Figure 5D:
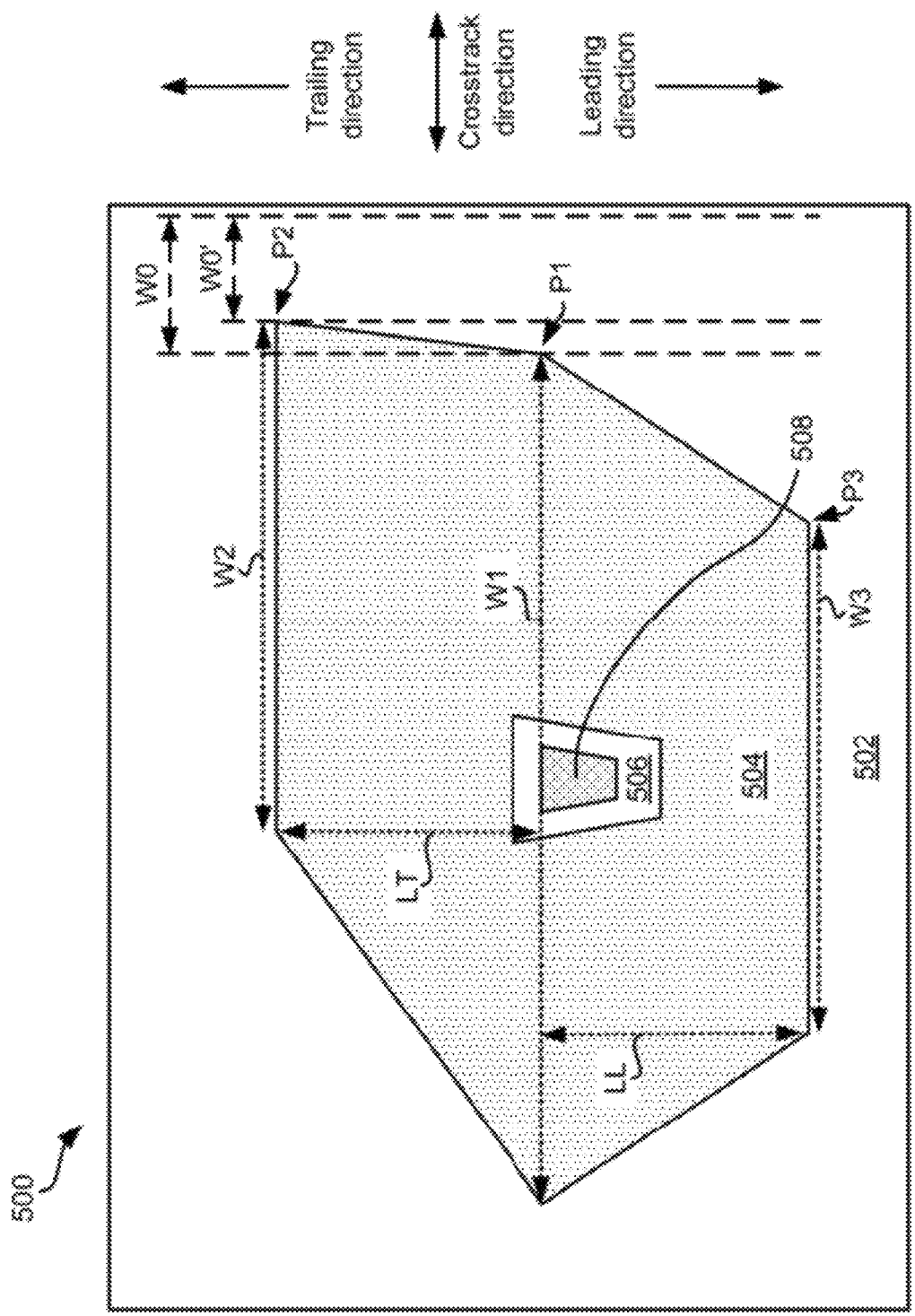
FIG. 5D shows a schematic representation of the ABS side of a magnetic head, according to one embodiment.
Figure 5E:
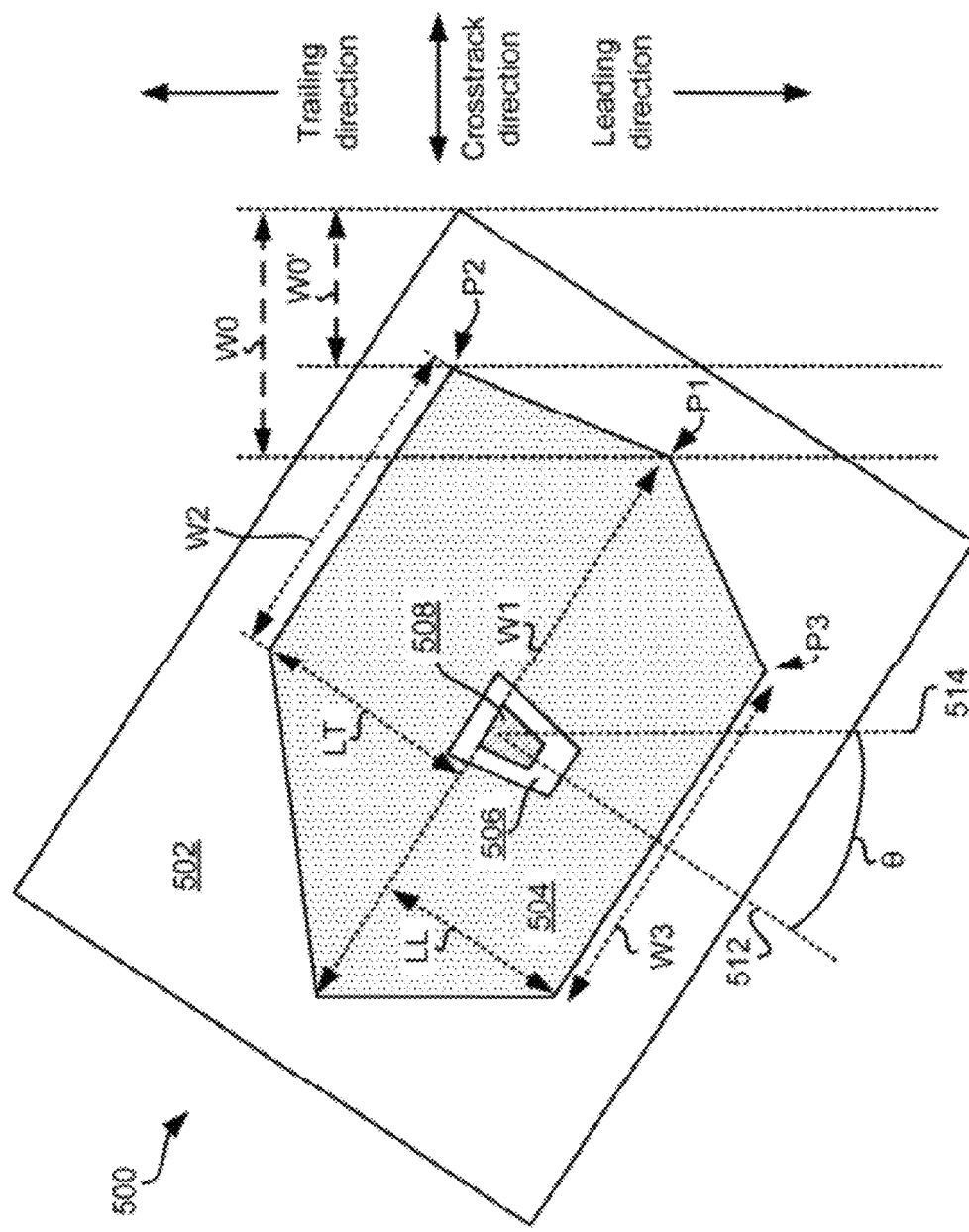
FIG. 5E shows a schematic representation of the ABS side of a magnetic head, aligned at a skew angle θ, according to one embodiment.
Figure 5F:
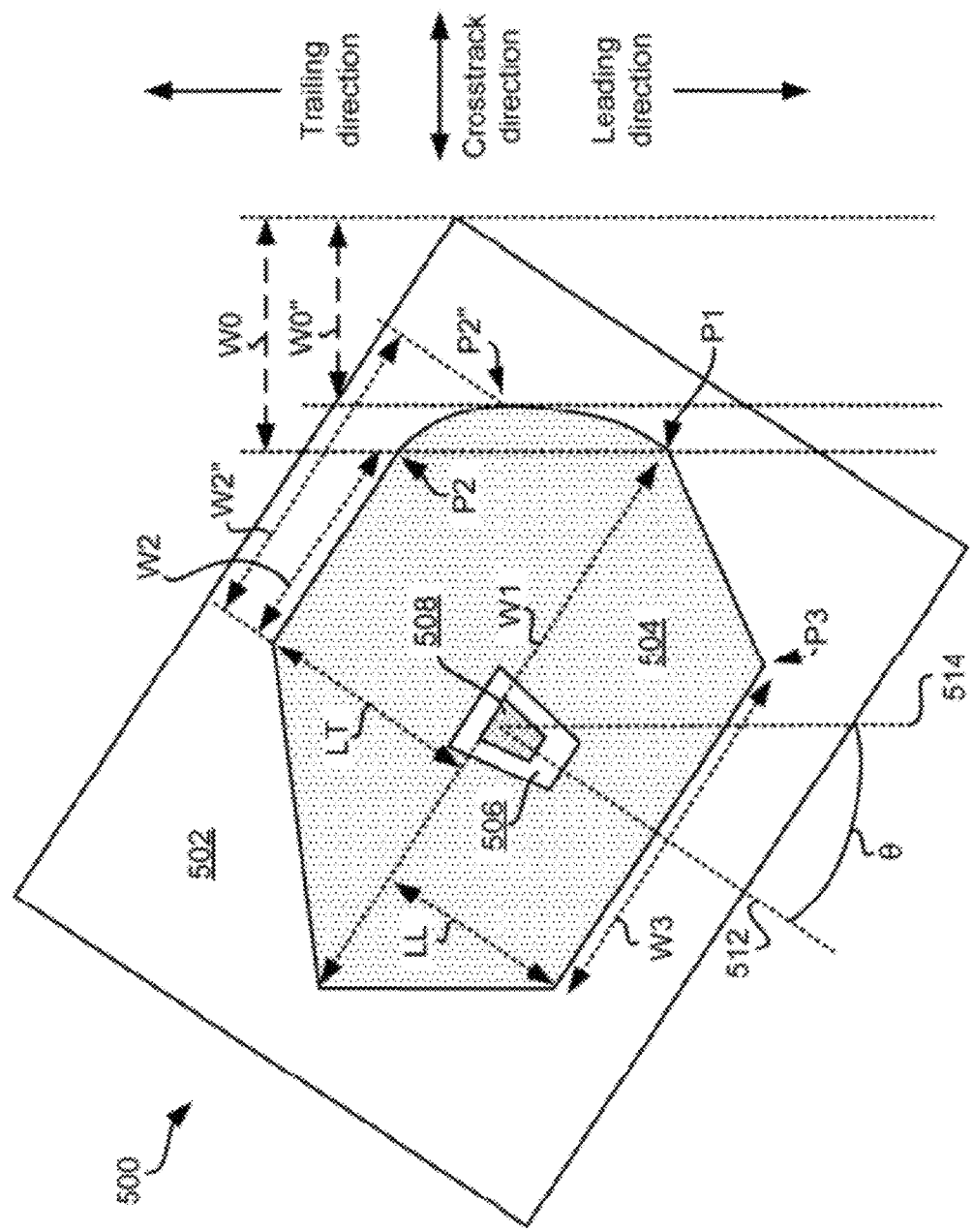
FIG. 5F shows a schematic representation of the ABS side of a magnetic head, aligned at a skew angle θ, according to one embodiment.

In operation, and according to several alternative embodiments depicted in FIGS. 5C, 5E, and 5F, the WAS 500 may be positioned at a skew angle θ, where θ is the angle between a first line 514 through a center of the trailing edge of the main magnetic pole 508 in the down-track direction (when the head is skewed) and a second line 512 through the center of the trailing edge of the main magnetic pole 508 and a center of a leading edge of the main magnetic pole 508.

The leading corner P3 and trailing corner P2 of the WAS 500 are exposed at the ABS and may be closer in the crosstrack direction to the main magnetic pole 508 than the maximum edge width corner P1 of the WAS 500 by an amount equal to LL*tan θ, as shown in FIGS. 5A-5C. Even in arrangements where the trailing edge width W2 and/or the leading edge width W3 is shorter than the maximum edge width W1, in some embodiments, the trailing and/or leading edge P2 and/or P3, respectively, may be farther in the crosstrack direction from the main magnetic pole 508 than the maximum width corner P1, as shown in FIGS. 5D and 5E, which is undesirable.

As shown in FIGS. 5D-5F, while the distance between the main pole 508 and trailing edge corner P2 or leading edge corner P3 may not exceed the distance between the main pole 508 and maximum width corner P1, the risk-range width W0 associated with the maximum width corner P1 may exceed the risk-range width W0' (W0" in FIG. 5F) associated with the trailing edge corner P2 (P2" in FIG. 5F), so long as the relative distance between the main pole 508 and each of the trailing edge corner P2 and leading edge corner P3 is less than the distance between the main pole 508 and the maximum width corner P1, as shown in FIG. 5F, but not in the arrangements shown in FIG. 5D or FIG. 5E.

In alternative arrangements, each trailing corner of the WAS 500 exposed at the ABS on a trailing side may be closer to the main magnetic pole 508 than sides of the WAS 500 in the crosstrack direction by an amount equal to LT*tan θ.

In still other alternative arrangements, each leading corner of the WAS 500 exposed at the ABS may be closer to the main magnetic pole 508 than sides of the WAS 500 in the crosstrack direction by an amount equal to LL*tan θ, and each trailing corner of the WAS 500 exposed at the ABS on a trailing side may be closer to the main magnetic pole 508 than sides of the WAS 500 in the crosstrack direction by an amount equal to LT*tan θ.

Furthermore, in some preferred embodiments, the dimensions of the exposed region 504 of the WAS 500 may satisfy relationships given in Equations 1 and 2, below.

$$W2 < W1 - 2(TL * \tan \theta) \quad \text{Equation 1}$$

$$W3 < W1 - 2(LL * \tan \theta) \quad \text{Equation 2}$$

Further still, a maximum width of the exposed region of the WAS 500 W1 may occur at a crosstrack position corresponding to the trailing edge of the main magnetic pole 508, according to one embodiment, or at a crosstrack position corresponding to a position anywhere in the trailing portion of the gap 506, according to another embodiment.

In preferred embodiments, the shape of the WAS 500 that is exposed at the ABS surface may become narrower in width toward the trailing direction and toward the leading direction, as shown in FIGS. 5B-C. In arrangements exhibiting a skew, as shown in FIG. 5C, the risk-range 510 may be narrowed by a width W0, which is equal to a distance that a typical trapezoidal exposed region of the WAS would cover in operation.

In the arrangements shown in FIGS. 5A-5C, the position and passage of the head is taken into consideration as part of the refreshment system. Furthermore, changes in thickness of the recessed region 502 along the film thickness direction (i.e., the element height direction) are within the positional range of head passage.

As described above, and according to some embodiments, the risk of FTI may be reduced by recessing at least a portion the WAS 500 from the ABS. While the risk of a strong magnetic domain being formed is reduced in the recessed region 502, magnetic domains may still occur. Thus, even where a magnetic domain occurs in the recessed region 502, the resulting magnetic field intensity as experienced by the medium is small, and therefore the associated risk of FTI is small. In this manner, the risk of FTI is thus limited to region 504, where the magnetic body of the WAS 500 has been exposed at the ABS. Therefore, only the exposed region 504 requires maintenance by the refreshment system, and its utility may be harnessed while simultaneously reducing the amount of information stored to memory.

Moreover, reducing the area of the exposed region 504 may further reduce refreshment system memory usage. However, as the exposed region 504 decreases, magnetic field intensity within that area increases, causing more frequent erasure. In order to minimize this erasure, it is preferable that the head exhibit dimensions adhering to the relationship shown in Equation 3, where MPs is an area of the main magnetic pole 508, MPbs is a saturation magnetic flux of the main magnetic pole 508 material, WASs is an area of the WAS 500 that is exposed at the ABS, and WASbs is a saturation magnetic flux of the WAS 500.

$$MPs*MPbs < WASs*WASbs \qquad \text{Equation 3}$$

Leakage magnetic fields may be generated by magnetic domains at positions of film thickness change in the WAS 500. In order to account for such leakage and any resulting errors, these positions should be within the range of the refreshment system. In one preferred embodiment the position of film thickness change in the WAS 500 which is closest to the main magnetic pole 508 occurs within the risk-range 510 and therefore is under the purview of the refreshment system.

Figure 6A:
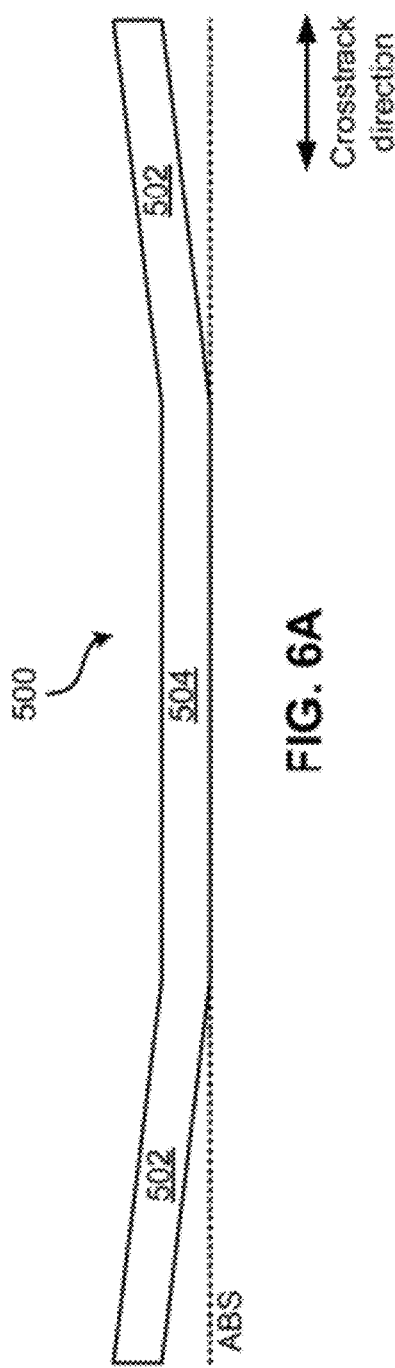
FIG. 6A shows a cross-sectional schematic of a tapered magnetic head, according to one embodiment.
Figure 6B:
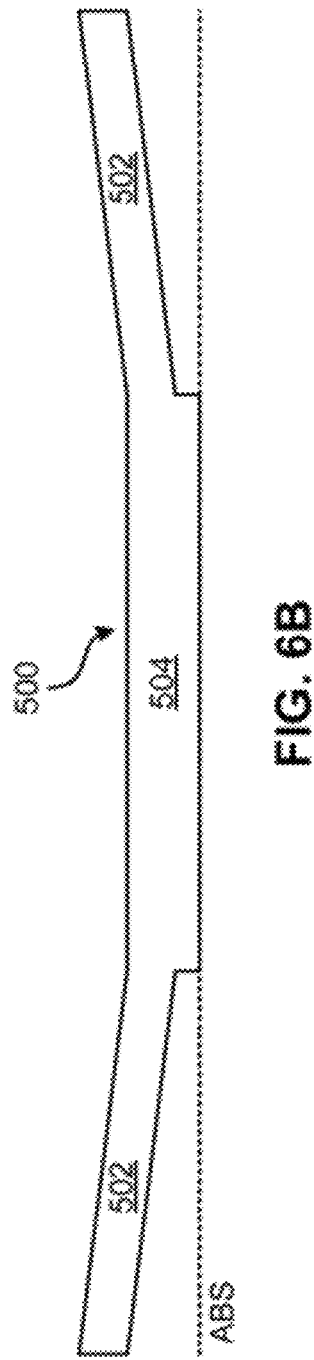
FIG. 6B shows a cross-sectional schematic of a stepped magnetic head, according to one embodiment.

FIGS. 6A and 6B show a cross-sectional view of the WAS 500 portion of the magnetic head, according to two embodiments. In the embodiment depicted in FIG. 6A, the portion of the WAS 500 that is not exposed at the ABS (the recessed region 502) is gradually tapered away from the portion that is exposed at the ABS (the exposed region 504). In another embodiment, as shown in FIG. 6B, the portion of the WAS 500 that is not exposed at the ABS (the recessed region 502) is stepped away from the portion that is exposed at the ABS (the exposed region 504), e.g., there is a stepped recess away from the exposed region 504 of the WAS 500 with concurrent tapering away from the exposed region 504 of the WAS 500. Of course, other recessing schemes may be used as would be understood by one of skill in the art upon reading the present descriptions, and FIGS. 6A-6B are only included as exemplary recessing embodiments and are not meant to be limiting on the invention in any way.

Figure 7:
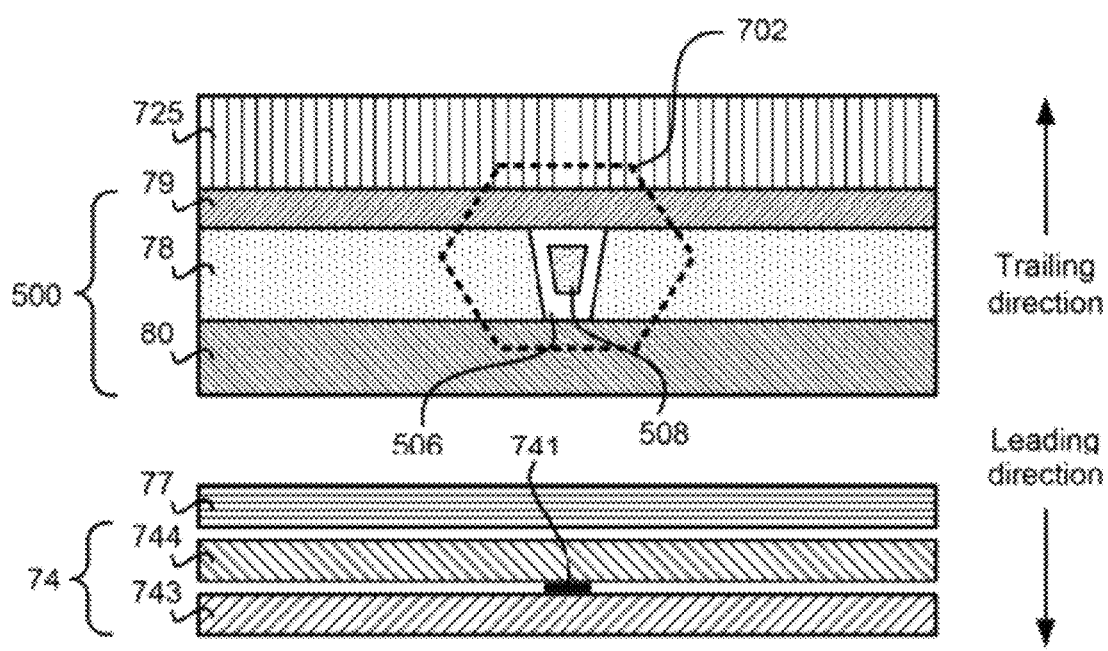
FIG. 7 shows a cross-sectional schematic of the ABS of a magnetic head, according to one embodiment.

FIG. 7 shows an ABS view of a magnetic head utilizing a refreshment system, according to one embodiment. Arranged from a leading edge to a trailing edge, the magnetic head includes a coil 74 comprising a reproduction element 743 and a lower reproduction shield 744 trailing the reproduction element 743. A reproduction head 741 may further be positioned between the reproduction element 743 and the lower reproduction shield 744. An upper reproduction shield 77 is additionally positioned trailing the coil 74. As shown in FIG. 7, the WAS 500 is positioned trailing the upper reproduction coil 77 and comprises a leading shield 80, side shield 78, and trailing shield 79. The main magnetic pole 508 protrudes from the side shield 78 in a direction toward the ABS.

In preferred embodiments, not only the WAS 500 but also the return pole 725 is recessed. For example, as shown in FIG. 7, the side shield 78, leading shield 80, and trailing shield 79 portions enclosed by region 702 are exposed at the ABS surface, and portions outside these are preferably recessed from the ABS surface.

Figure 8:
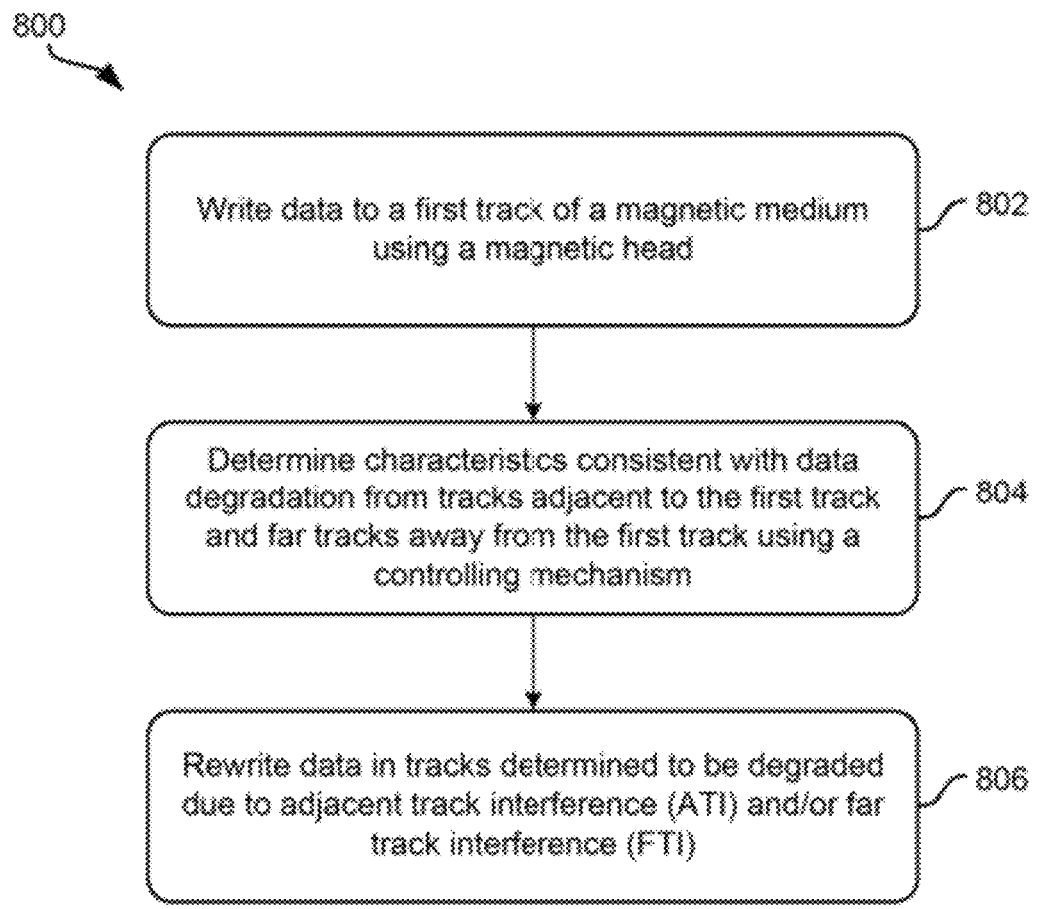
FIG. 8 is a flowchart of a method for writing data to a magnetic medium according to one embodiment.
Figure 9:
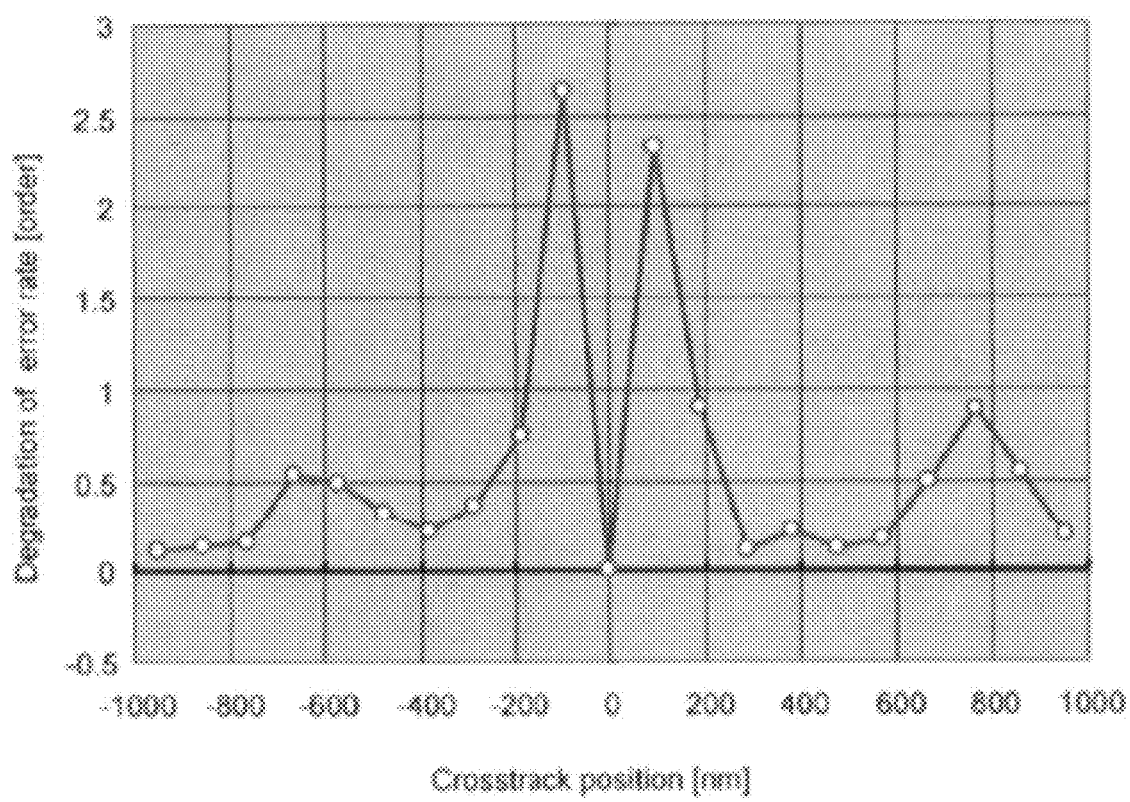
FIG. 9 is a graph representing a relationship between magnetic head crosstrack position and error rate, according to the prior art.

Now referring to FIG. 8, a method 800 for writing data to a magnetic medium is shown according to one embodiment. The method 800 may be carried out in any desired environment, including those shown in FIGS. 1-7, among others.

In operation 802, data is written to a first track of a magnetic medium using a magnetic head. Any method may be used to write the data initially, as would be understood by one of skill in the art upon reading the present descriptions.

In operation 804, characteristics consistent with data degradation are determined from tracks adjacent to the first track and far tracks away from the first track using a controlling mechanism, as would be understood by one of skill in the art upon reading the present descriptions.

Some illustrative degradation characteristics include a position passed by the magnetic head, a number of times the magnetic head passes, an intensity of a magnetic field gradient experienced by a track, etc.

In operation 806, data is rewritten in tracks determined to be degraded due to adjacent ATI and/or FTI.

According to one embodiment, the magnetic head may comprise: a main magnetic pole and a WAS positioned around the main magnetic pole at an ABS thereof, wherein a maximum width in a crosstrack direction of the WAS exposed at the ABS is narrower than a predetermined risk range measured in the crosstrack direction and wherein the controlling mechanism is electrically coupled to the magnetic head for controlling operation of the magnetic head and initiates rewriting of information of a recording track of the magnetic medium if a recording magnetic field applied to the recording track exceeds a threshold value.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A data storage system, comprising:
    a main magnetic pole;
    a wrap around shield (WAS) positioned around the main magnetic pole near an air bearing surface (ABS) thereof, wherein a maximum width in a crosstrack direction of the WAS exposed at the ABS is narrower than a predetermined risk range measured in the crosstrack direction; and
    a mechanism that initiates rewriting of information of a recording track of a magnetic medium if a recording magnetic field applied to the recording track exceeds a threshold value.

2. The data storage system as recited in claim 1, wherein a width in the crosstrack direction of the WAS exposed at the ABS is at a maximum at a position corresponding to a trailing edge of the main magnetic pole in a down-track direction.

3. The data storage system as recited in claim 2, wherein the WAS exposed at the ABS has a hexagonal shape defined by two longer sides parallel to the crosstrack direction oriented at a leading and a trailing edge of the WAS.

4. The data storage system as recited in claim 2, wherein each leading corner of the WAS exposed at the ABS is closer to the main magnetic pole than sides of the WAS in the crosstrack direction by an amount equal to LL*tan θ, where LL is a distance between the trailing edge of the main magnetic pole and a leading edge of the WAS exposed at the ABS, where θ is a skew angle between a line through a center of the trailing edge of the main magnetic pole in the down-track direction and a line through the center of the trailing edge and a center of a leading edge of the main magnetic pole.

5. The data storage system as recited in claim 2, wherein each trailing corner of the WAS exposed at the ABS on a trailing side is closer to the main magnetic pole than sides of the WAS in the crosstrack direction by an amount equal to LT*tan θ, where LT is a distance between the trailing edge of the main magnetic pole and a trailing edge of the WAS exposed at the ABS, and where θ is a skew angle between a line through a center of the trailing edge of the main magnetic pole in the down-track direction and a line through the center of the trailing edge and a center of a leading edge of the main magnetic pole.

6. The data storage system as recited in claim 5, wherein each leading corner of the WAS exposed at the ABS is closer to the main magnetic pole than sides of the WAS in the crosstrack direction by an amount equal to LL*tan θ, where LL is a distance between the trailing edge of the main magnetic pole and a leading edge of the WAS exposed at the ABS, where θ is a skew angle between a line through a center of the trailing edge of the main magnetic pole in the down-track direction and a line through the center of the trailing edge and a center of a leading edge of the main magnetic pole.

7. The data storage system as recited in claim 6, wherein a width (W2) of the trailing edge of the WAS exposed at the ABS and a width (W1) of the WAS exposed at the ABS at the trailing edge of the main magnetic pole satisfies a relationship where W2<W1−2(TL*tan θ).

8. The data storage system as recited in claim 6, wherein a width (W3) of the leading edge of the WAS exposed at the ABS and a width (W1) of the WAS exposed at the ABS at the trailing edge of the main magnetic pole satisfies a relationship where W3<W1−2(LL*tan θ).

9. The data storage system as recited in claim 1, wherein an area (MPs) of the main magnetic pole exposed at the ABS, a saturation magnetic flux (MPbs) of the main magnetic pole, an area (WASs) of the WAS exposed at the ABS, and a saturation magnetic flux (WASbs) of the WAS satisfies a relationship where MPs*MPbs<WASs*WASbs.

10. The data storage system as recited in claim 1, wherein a recessed portion of the WAS not exposed at the ABS either tapers gradually or is stepped away from the portion of the WAS exposed at the ABS.

11. The data storage system as recited in claim 1, further comprising:
the magnetic medium; and
a drive mechanism for passing the magnetic medium over the main magnetic pole.

12. A data storage system, comprising:
a magnetic head, comprising:
a main magnetic pole; and
a wrap around shield (WAS) positioned around the main magnetic pole at an air bearing surface (ABS) thereof, wherein a maximum width in a crosstrack direction of the WAS exposed at the ABS is narrower than a predetermined risk range measured in the crosstrack direction;
a magnetic medium;
a drive mechanism for passing the magnetic medium over the magnetic head; and
a controlling mechanism electrically coupled to the magnetic head for controlling operation of the magnetic head that initiates rewriting of information of a recording track of the magnetic medium if a recording magnetic field applied to the recording track exceeds a threshold value.

13. The data storage system as recited in claim 12, wherein a width in the crosstrack direction of the WAS exposed at the ABS is at a maximum at a position corresponding to a trailing edge of the main magnetic pole in a down-track direction.

14. The data storage system as recited in claim 13, wherein the WAS exposed at the ABS has a hexagonal shape defined by two longer sides parallel to the crosstrack direction oriented at a leading and a trailing edge of the WAS.

15. The data storage system as recited in claim 13, wherein each leading corner of the WAS exposed at the ABS is closer to the main magnetic pole than sides of the WAS in the crosstrack direction by an amount equal to LL*tan θ, where LL is a distance between the trailing edge of the main magnetic pole and a leading edge of the WAS exposed at the ABS, where θ is a skew angle between a line through a center of the trailing edge of the main magnetic pole in the down-track direction and a line through the center of the trailing edge and a center of a leading edge of the main magnetic pole.

16. The data storage system as recited in claim 13, wherein each trailing corner of the WAS exposed at the ABS on a trailing side is closer to the main magnetic pole than sides of the WAS in the crosstrack direction by an amount equal to LT*tan θ, where LT is a distance between the trailing edge of the main magnetic pole and a trailing edge of the WAS exposed at the ABS, and where θ is a skew angle between a line through a center of the trailing edge of the main magnetic pole in the down-track direction and a line through the center of the trailing edge and a center of a leading edge of the main magnetic pole.

17. The data storage system as recited in claim 16, wherein each leading corner of the WAS exposed at the ABS is closer to the main magnetic pole than sides of the WAS in the crosstrack direction by an amount equal to LL*tan θ, where LL is a distance between the trailing edge of the main magnetic pole and a leading edge of the WAS exposed at the ABS, where θ is a skew angle between a line through a center of the trailing edge of the main magnetic pole in the down-track direction and a line through the center of the trailing edge and a center of a leading edge of the main magnetic pole.

18. The data storage system as recited in claim 17, wherein a width (W2) of the trailing edge of the WAS exposed at the ABS and a width (W1) of the WAS exposed at the ABS at the trailing edge of the main magnetic pole satisfies a relationship where W2<W1−2(TL*tan θ).

19. The data storage system as recited in claim 17, wherein a width (W3) of the leading edge of the WAS exposed at the ABS and a width (W1) of the WAS exposed at the ABS at the trailing edge of the main magnetic pole satisfies a relationship where W3<W1−2(LL*tan θ).

20. The data storage system as recited in claim 12, wherein an area (MPs) of the main magnetic pole exposed at the ABS, a saturation magnetic flux (MPbs) of the main magnetic pole, an area (WASs) of the WAS exposed at the ABS, and a saturation magnetic flux (WASbs) of the WAS satisfies a relationship where MPs*MPbs<WASs*WASbs.

21. The data storage system as recited in claim 12, wherein a recessed portion of the WAS not exposed at the ABS either tapers gradually or is stepped away from the portion of the WAS exposed at the ABS.

22. A method for storing data to a magnetic medium, the method comprising:
- writing data to a first track of a magnetic medium using a magnetic head;
- determining characteristics consistent with data degradation from tracks adjacent to the first track and far tracks away from the first track using a controlling mechanism; and
- rewriting data in tracks determined to be degraded due to adjacent track interference (ATI) and/or far track interference (FTI), wherein the magnetic head comprises:
- a main magnetic pole; and
- a wrap around shield (WAS) positioned around the main magnetic pole at an air bearing surface (ABS) thereof, wherein a maximum width in a crosstrack direction of the WAS exposed at the ABS is narrower than a predetermined risk range measured in the crosstrack direction; and wherein the controlling mechanism is electrically coupled to the magnetic head for controlling operation of the magnetic head and initiates rewriting of information of a recording track of the magnetic medium if a recording magnetic field applied to the recording track exceeds a threshold value.

* * * * *